United States Patent
Warszawski et al.

(10) Patent No.: US 9,397,883 B2
(45) Date of Patent: Jul. 19, 2016

(54) MODIFYING NETWORK SETTINGS OF AN UNREACHABLE HOST

(71) Applicant: Red Hat Israel, Ltd., Raanana (IL)

(72) Inventors: Eduardo Warszawski, Kfar Saba (IL); Yeela Kaplan, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/139,259

(22) Filed: Dec. 23, 2013

(65) Prior Publication Data

US 2015/0180709 A1    Jun. 25, 2015

(51) Int. Cl.
*H04L 12/24* (2006.01)
*H04L 12/08* (2006.01)
(Continued)

(52) U.S. Cl.
CPC ............ *H04L 41/0672* (2013.01); *H04L 41/08* (2013.01); *H04L 43/0811* (2013.01); *H04L 43/0829* (2013.01); *H04L 45/00* (2013.01); *H04L 45/52* (2013.01);
(Continued)

(58) Field of Classification Search
CPC ......... H04M 15/00; H04L 7/00; H04L 27/00; H04L 29/02–29/06006; H04L 45/00; H04L 49/00; H04L 61/10; H04L 61/20–61/203; H04L 61/251; H04L 61/2542; H04L 12/56; H04L 12/00; H04L 12/66; H04L 29/00; H04L 26/06068; H04L 29/06163; H04L 45/02; H04L 67/00; H04L 67/28; H04L 67/2814; H04L 67/2823; H04L 69/18; H04L 12/02; H04L 12/24; H04L 12/2401; H04L 12/2405; H04L 12/2414; H04L 12/2418; H04L 12/2422; H04L 12/2424; H04L 12/2425; H04L 12/2428; H04L 12/2453; H04L 12/26; H04L 12/2602; H04L 12/2634–12/2639; H04L 12/2644–12/2655; H04L 41/00; H04L 41/06; H04L 41/0654; H04L 41/0668–41/0672; H04L 41/08; H04L 41/0803; H04L 41/0813–41/0816; H04L 43/00; H04L 43/08–43/0811; H04L 43/0823–43/0847; H04L 49/25; G06F 13/00; G06F 9/46; G06F 15/16; G06F 13/14; G06F 15/00; G06F 11/00; G06F 11/008; G06F 11/07; G06F 11/0751; G06F 11/0793; G06F 11/30; G06F 15/177
USPC .................. 709/203, 217, 219–224, 226–228
See application file for complete search history.

(56) References Cited

U.S. PATENT DOCUMENTS 5,251,205 A * 10/1993 Callon et al. .................. 370/392
5,778,189 A * 7/1998 Kimura et al. ................ 709/236
(Continued)

OTHER PUBLICATIONS

Narten, T, "Neighbor Discovery and Stateless Auto Configuration in IPv6", IEEE Internet Computing, Jul.-Aug. 1999, 9 pages.
(Continued)

*Primary Examiner* — Brian J Gillis
*Assistant Examiner* — Boris Grijalva Lobos
(74) *Attorney, Agent, or Firm* — Lowenstein Sandler LLP

(57) ABSTRACT

An exemplary system may configure network settings of an unreachable host. In one embodiment, the system determines that a first host on a network is unreachable using a first communication protocol. The system selects a second host on the network that is reachable using the first communication protocol. The second host on the network can reach the first host using a second communication protocol. The system provides a communication to the second host on the network using the first communication protocol. The communication causes the second host to access the first host on the network using the second communication protocol.

20 Claims, 4 Drawing Sheets

(51) Int. Cl.
*H04L 12/26* (2006.01)
*H04L 12/701* (2013.01)
*H04L 29/12* (2006.01)
*H04L 12/781* (2013.01)

(52) U.S. Cl.
CPC ........ *H04L 41/0803* (2013.01); *H04L 41/0886* (2013.01); *H04L 61/2007* (2013.01); *H04L 61/6004* (2013.01); *H04L 61/6086* (2013.01)

(56) References Cited

U.S. PATENT DOCUMENTS

| | | | |
|---|---|---|---|
| 5,991,381 A * | 11/1999 | Bouanaka et al. | 379/114.15 |
| 6,118,784 A * | 9/2000 | Tsuchiya et al. | 370/401 |
| 6,237,049 B1 * | 5/2001 | Ludtke | 710/8 |
| 6,278,697 B1 * | 8/2001 | Brody et al. | 370/310 |
| 6,400,729 B1 * | 6/2002 | Shimadoi et al. | 370/466 |
| 6,442,687 B1 * | 8/2002 | Savage | 713/156 |
| 6,643,701 B1 * | 11/2003 | Aziz et al. | 709/227 |
| 6,650,621 B1 * | 11/2003 | Maki-Kullas | 370/238 |
| 7,006,526 B1 * | 2/2006 | Biederman | 370/466 |
| 7,151,884 B1 | 12/2006 | Rayes et al. | |
| 7,293,077 B1 | 11/2007 | Teo et al. | |
| 7,333,510 B1 * | 2/2008 | Hies et al. | 370/467 |
| 7,391,768 B1 * | 6/2008 | Samprathi et al. | 370/389 |
| 7,523,097 B1 | 4/2009 | Wilson et al. | |
| 7,526,562 B1 * | 4/2009 | Samprathi et al. | 709/230 |
| 8,078,787 B2 * | 12/2011 | Lydon et al. | 710/315 |
| 8,281,385 B2 * | 10/2012 | Callagahan | 726/15 |
| 8,365,010 B2 | 1/2013 | Olson et al. | |
| 8,472,342 B1 * | 6/2013 | Bucko | H04L 12/5691 370/238 |
| 8,848,575 B2 * | 9/2014 | Vobbilisetty | 370/254 |
| 8,938,061 B1 * | 1/2015 | Dendy et al. | 379/225 |
| 2002/0026533 A1 * | 2/2002 | Dutta et al. | 709/313 |
| 2002/0138848 A1 * | 9/2002 | Alao et al. | 725/109 |
| 2003/0053443 A1 * | 3/2003 | Owens | 370/352 |
| 2003/0149720 A1 * | 8/2003 | Goldstein | H04L 29/06 709/202 |
| 2004/0013097 A1 * | 1/2004 | Massa | 370/335 |
| 2004/0219935 A1 * | 11/2004 | McCann et al. | 455/466 |
| 2004/0230693 A1 * | 11/2004 | Baus et al. | 709/230 |
| 2005/0172012 A1 * | 8/2005 | Casati | 709/220 |
| 2005/0185671 A1 * | 8/2005 | Hansen et al. | 370/466 |
| 2006/0062248 A1 * | 3/2006 | Huang et al. | 370/466 |
| 2006/0146826 A1 * | 7/2006 | Namihira | 370/392 |
| 2007/0047571 A1 * | 3/2007 | Kandikonda et al. | 370/449 |
| 2007/0074280 A1 * | 3/2007 | Callaghan | 726/12 |
| 2007/0242694 A1 * | 10/2007 | Signaoff et al. | 370/466 |
| 2008/0091812 A1 * | 4/2008 | Lev-Ran | H04L 29/12169 709/223 |
| 2008/0109539 A1 * | 5/2008 | Foster et al. | 709/221 |
| 2008/0137571 A1 * | 6/2008 | Suga et al. | 370/310 |
| 2008/0232381 A1 * | 9/2008 | Elwell | 370/400 |
| 2008/0294797 A1 * | 11/2008 | Nolterieke et al. | 709/245 |
| 2009/0070250 A1 * | 3/2009 | Adcock et al. | 705/37 |
| 2009/0198992 A1 * | 8/2009 | Rofougaran | 713/2 |
| 2009/0228603 A1 * | 9/2009 | Ritzau | H04L 67/288 709/238 |
| 2009/0240790 A1 * | 9/2009 | Utsunomiya et al. | 709/221 |
| 2009/0313345 A1 * | 12/2009 | Dollar et al. | 709/206 |
| 2011/0289230 A1 * | 11/2011 | Ueno | H04L 45/42 709/228 |
| 2012/0173746 A1 * | 7/2012 | Salinger et al. | 709/230 |
| 2012/0307630 A1 | 12/2012 | Markwart et al. | |
| 2013/0036307 A1 | 2/2013 | Gagliano et al. | |
| 2013/0067231 A1 * | 3/2013 | Mudigonda et al. | 713/175 |

OTHER PUBLICATIONS

Chelius, Guillame et al. "No Administration Protocol (NAP) for IPv6 Router Auto-Configuration", 19th International Conference on Advanced Information Networking and Applications, 2005. AINA 2005, Mar. 28-30, 2005, 5 pages.

Nordmark, E. "Basic Transition Mechanisms for IPv6 Hosts and Routers", Oct. 2005, 28 pages.

* cited by examiner

MODIFYING NETWORK SETTINGS OF AN UNREACHABLE HOST

TECHNICAL FIELD

Embodiments of the present invention relate to networking settings of a computing system, and more particularly, to a technique for configuring network settings of an unreachable host.

BACKGROUND

A management computing system can manage one or more host computing systems. When the network settings of a host computing system are configured incorrectly, the management computing system cannot reach the host computing system. Moreover, the management computing system cannot reconfigure the network settings of the unreachable host.

BRIEF DESCRIPTION OF THE DRAWINGS

Various embodiments of the present invention will be understood more fully from the detailed description given below and from the accompanying drawings of various embodiments of the invention.

DETAILED DESCRIPTION

A management system can manage multiple hosts on a network. The management system can communicate with the hosts over the network using a first communication protocol, such as Internet Protocol version 4 (IPv4). The hosts can communicate or access other hosts using a second communication protocol, such as Internet Protocol version 6 (IPv6). If a configuration on a host is incorrect for the first communication protocol, then the management system cannot configure the host, and the host is considered an unreachable host by the management system. In order to reach the unreachable host, the management system needs to reconfigure the configuration for the first communication protocol on the unreachable host. However, the management system cannot reconfigure the configuration because the only way for the management system to communicate with the unreachable host is using the configuration for the first communication protocol, which cannot be done because the configuration is incorrect.

Embodiments of the invention pertain to configuring network settings or a network configuration of an unreachable host. The management system is able to reconfigure the unreachable host using a reachable host on the network. Using the first communication protocol, the management system can instruct the second host to modify the configuration for the first communication protocol on the first host based on the second communication protocol. For example, the management system communicates with the reachable host using IPv4 to instruct the reachable host to overwrite the IPv4 configuration in the unreachable host using IPv6.

Figure 1:
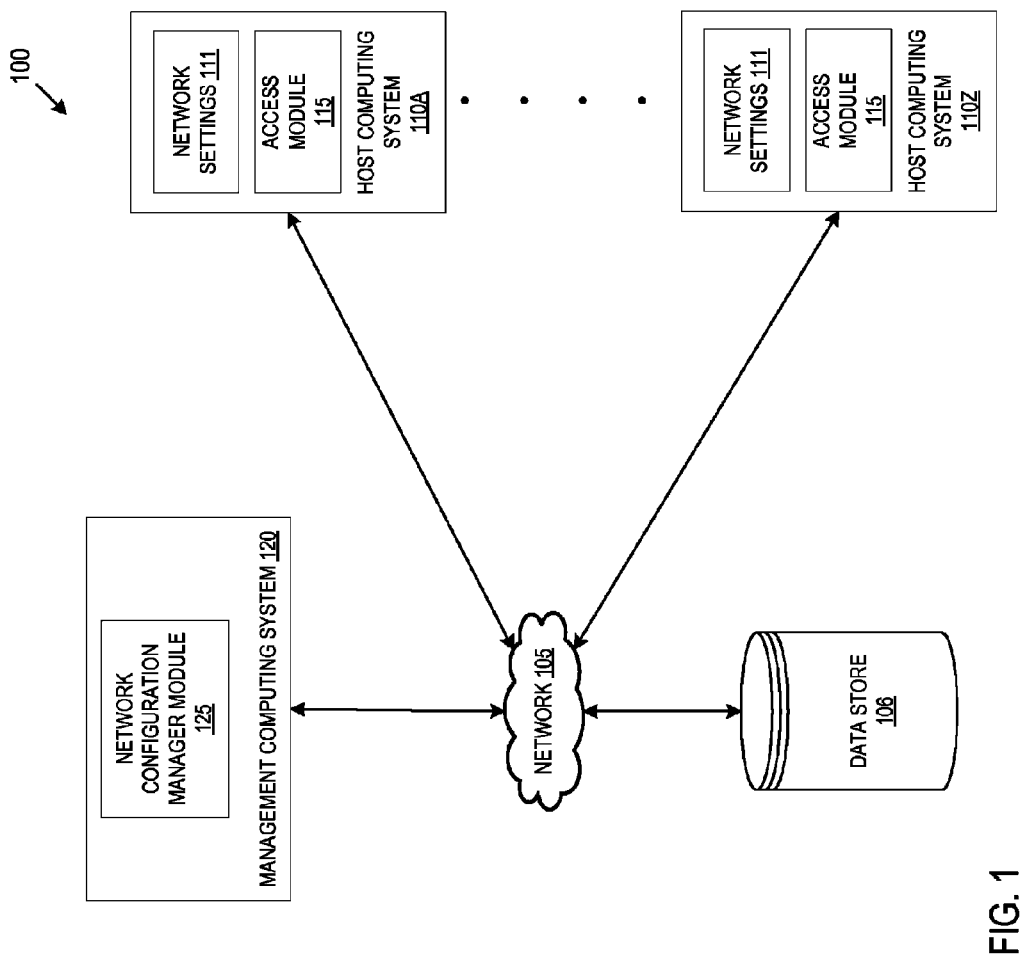
FIG. 1 illustrates exemplary system architecture, in accordance with various embodiments of the present invention.

FIG. 1 illustrates an example system architecture 100, in accordance with one implementation of the disclosure, for configuring network settings of an unreachable host. The system architecture 100 includes host computing devices 110A through 110Z, a network 105, a data store 106 (optional), and a management computing system 120. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In one implementation, the management computing system 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to manage a group of host computing devices 110A-110Z. For example, the management computing system 120 may configure the network settings of the host computing devices 110A-110Z.

Examples of each host computing system 110A-110Z may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. Each host computing system 110A-110Z may include a hypervisor and one or more virtual machines running on top of the hypervisor.

Data store 106 can reside on one or more writable persistent storage devices, such as memories, tapes or disks. In one embodiment, the one or more writable persistent storage devices are non-Random Access Memory (RAM) devices. Although each of host computing systems 110A-110Z and data store 106 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the data store 106 can include data related to the host computing systems 110A-110Z. Examples of data related to the host computing system 105 can include, and are not limited to, communication protocol information (e.g., Internet Protocol version 4, Internet Protocol version 6 (IPv6), etc.) for each of the host computing systems 110A-110Z, and any other electronically stored information that can be associated with a system, etc.

During operation of the system architecture 100, the management computing system 120 can attempt to configure the network settings of one or more of host computing systems 110A-110Z, such as host computing system 110A. In one embodiment, the management computing system 120 can include a network configuration manager module 125 to configure the network settings of a host computing system. However, the network configuration management module 125 can determine that the host computing system 110A is unreachable. For example, the host computing system 110A is unreachable because it is misconfigured, has an incorrect communication protocol address, etc. The network configuration manager module 125 can select a host computing system from the remaining host computing systems 110B-110Z that are on the network 105, such as host computing system 110Z, to use to reconfigure the unreachable host computing system 110A. The network configuration management module 125 can provide a communication to the host computing system 110Z to cause the host computing system 110Z to modify the network configuration of the host computing system 110A such that the host computing system 110A is reachable. Further description of the network configuration manager module 125 and its specific functions is described in more detail below with respect to FIG. 2.

In one embodiment, each of the host computing systems 110A-110Z can include an access module 115 and network settings 111. In a virtualized environment, the access module 115 can be part of the hypervisor or run on top of the hypervisor. In a non-virtualized environment, the access module can run on top of the operating system. The access module 115 can be used to access another host computing system, such as using a connection through a specific internet protocol layer (e.g., application layer using secure shell (SSH), telnet, etc.) or using a secure communication protocol (e.g., SSH, telnet, etc.). Other means of access between host computing systems can be used without departing from the scope of the present disclosure.

Figure 2:
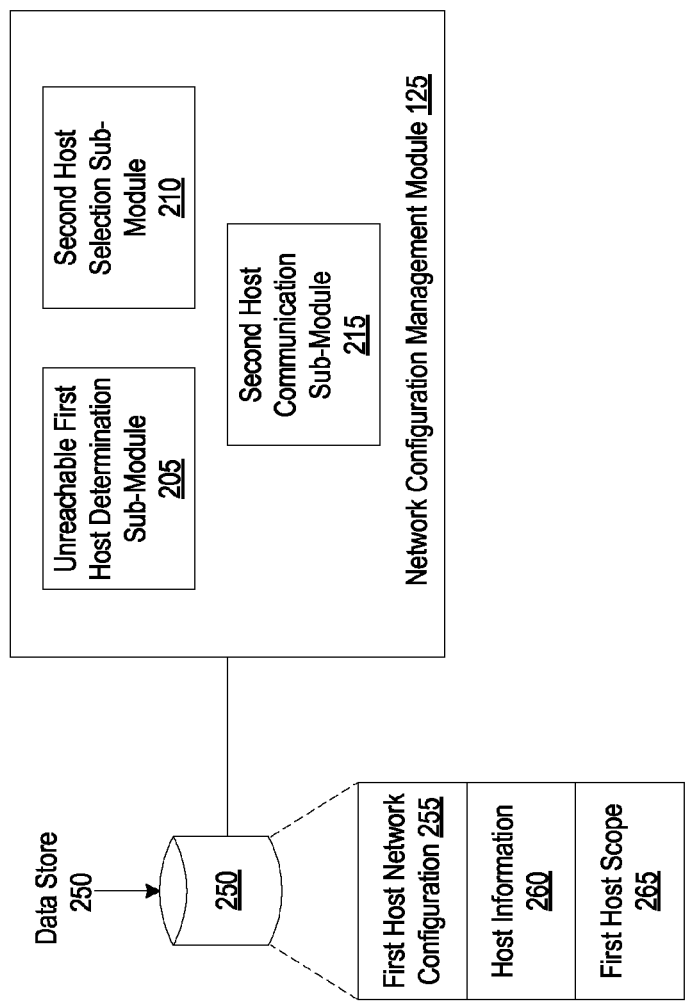
FIG. 2 is a block diagram of a network configuration manager module, in accordance with an embodiment.

FIG. 2 is a block diagram illustrating a network configuration management module 125 in accordance with one implementation of the disclosure. In one implementation, the network configuration management module 125 includes an unreachable first host determination sub-module 205, a second host selection sub-module 210, and a second host communication sub-module 215. More or less components may be included in the network configuration management module 125 without loss of generality. For example, two of the modules may be combined into a single module, or one of the modules may be divided into two or more modules. In one implementation, one or more of the modules may reside on different computing devices (e.g., different server computers).

The network configuration management module 125 is communicatively coupled to the data store 250. For example, the data store 250 may be directly coupled to a computing device (e.g., management computing system 120) where the network configuration management module 125 resides. In another example, the data store 250 may be coupled directly to a server where the network configuration management module 125 resides. The data store 250 may be a memory (e.g., random access memory), a cache, a drive (e.g., a hard drive), a flash drive, a database system, or another type of component or device capable of storing data. The data store 250 may also include multiple storage components (e.g., multiple drives or multiple databases) that may also span multiple computing devices (e.g., multiple server computers). The data store 250 includes host information 255, first communication protocol 260, and second communication protocol 265.

As discussed above, the network configuration management module 125 configures network settings of an unreachable host. Configuring network settings of an unreachable host may include determining a first host that is unreachable using a first communication protocol, selecting a second host that is reachable using the first communication protocol and that can reach the first host using a second communication protocol, and providing a communication to the second host to cause the second host to modify a network configuration associated with the first communication protocol on the second host using the second communication protocol.

The unreachable first host determination sub-module 205 can determine a first host that is unreachable using a first communication protocol. The first communication protocol can be a protocol associated or belonging to a specific layer or protocol module in a protocol stack. The first communication protocol can provide communication between a management system and multiple host systems on the network. The first host can be unreachable when a network configuration (e.g., address) for the first communication protocol on the first host is different than a network configuration stored in a data store, such as first host network configuration 255 in data store 250.

The second host selection sub-module 210 can select a second host that is reachable using the first communication protocol and that can reach the first host using a second communication protocol. The second host selection sub-module 210 can select the second host from a group of hosts available on the network. Information about the group of hosts available on the network can be stored in a data store, such as host information 260 in data store 250.

The second host communication sub-module 215 can provide a communication to the second host to cause the second host to modify a network configuration associated with the first communication protocol on the first host using the second communication protocol. The second host communication sub-module 215 can create the communication to provide to the second host by providing a scope associated with the first host to the second host and providing an update command to the second host. The scope associated with the first host can be stored in a data store, such as first host scope 265 in data store 250. In one embodiment, the scope is based on the network configuration for the second communication protocol on the first host. In an alternate embodiment, the scope associated with the first host is based on the network configuration for the second communication protocol on the first host and other network information. Once the second host communication sub-module 215 provides the communication to the second host using the second communication protocol, the second host can modify the network configuration associated with the first communication protocol on the first host such that the first host is reachable by the network configuration management module 125 using the first communication protocol.

Figure 3:
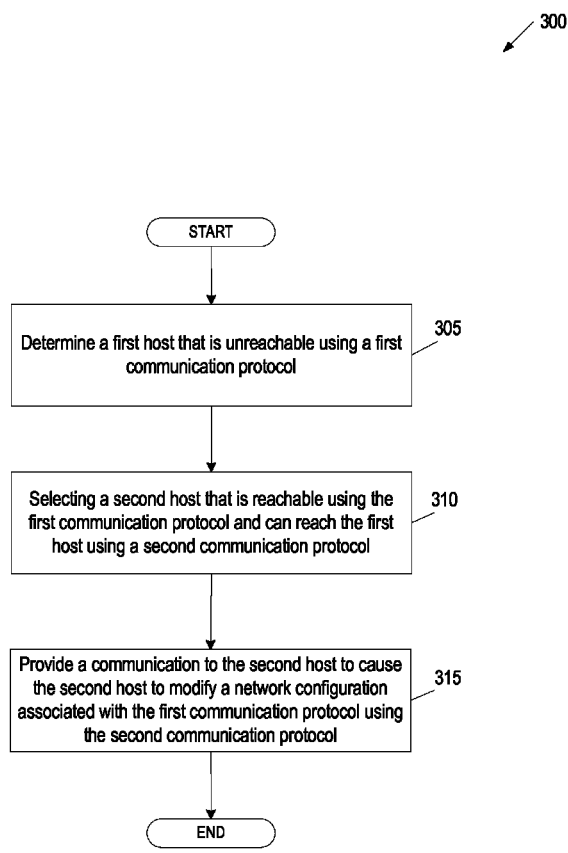
FIG. 3 is a flow diagram illustrating an embodiment for a method of configuring network settings of an unreachable host, in accordance with an embodiment.

FIG. 3 is a flow diagram of an embodiment of a method 300 for configuring network settings of an unreachable host. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a management system (e.g., management computing system 120 of FIG. 1).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by network configuration manager module 125, as shown in FIG. 1.

At block 305, processing logic determines a first host that is unreachable by the processing logic using a first communication protocol. The first host can be a host computing system on a network that runs one or more virtual machines. The first communication protocol can be a protocol associated or belonging to a specific layer or protocol module in a protocol stack. The first communication protocol can provide communication between a management system and multiple host systems on the network. For example, the first communication protocol can be an internet communication protocol that relays datagrams (e.g., packets) between the management systems and multiple hosts on the network, such as Internet Protocol version 4 (IPv4).

The first host can be unreachable when a network configuration (e.g., address) for the first communication protocol on the first host is different than a network configuration used by the processing logic to communicate with the first host, such as when the network configuration for the first communication protocol on the first host is misconfigured by a user, by another computing system, etc. For example, if processing logic has an IPv4 address of 192.0.2.235 for the first host, but a user has misconfigured IPv4 address of the first host to be 192.1.3.792, then processing logic will not be able to reach the first host.

In one embodiment, processing logic determines whether the first host is unreachable upon receiving a request to reconfigure the network configuration for the first communication protocol on the first host. In one embodiment, processing logic determines that a first host is unreachable using a first communication protocol by providing (e.g., sending) a request to the first host, such as a network reconfiguration request to reconfigure the network configuration for the first communication protocol on the first host, and receiving an error message for the request. In an alternate embodiment, processing logic determines that a first host is unreachable using a first communication protocol by providing (e.g., sending) a request to the first host, such as a network reconfiguration request to reconfigure the network configuration for the first communication protocol on the first host, and not receiving a response from the first host within a predetermined period of time. In another alternate embodiment, processing logic determines that a first host is unreachable using a first communicating protocol by testing the responsiveness of the first host. For example, processing logic can ping the first host to determine whether the first host is unreachable.

At block 310, processing logic selects a second host that is reachable using the first communication protocol and that can reach the first host using a second communication protocol. The second host can be a host computing system on the same network as the first host. The second host can run one or more virtual machines. In one embodiment, the second host is on the same network segment as the first host. The first host and the second host can be on the same network segment when packet routing is not required between the first host and the second host, such as when the first host and the second host are in a layer 2 broadcast domain. In an alternate embodiment, the second host is not on the same network segment as the first host, and is on a different network segment within the network. The first host and the second host can be on different network segments when packet routing is required between the first host and the second host, which allows the first host and second host to communicate using a global address (e.g., IPv6 global unicast address) rather than a local address (e.g., link-local address). In one embodiment, the second communication protocol is a protocol associated with or belonging to the same specific layer or protocol module in the protocol stack as the first communication protocol. In an alternate embodiment, the second communication protocol is a protocol associated with or belonging to a different specific layer or protocol module in the protocol stack as the first communication protocol. The second communication protocol can provide communication between multiple host systems on the network. For example, the second communication protocol can be an internet communication protocol that relays datagrams (e.g., packets) between hosts on the network, such as Internet Protocol version 6 (IPv6). The network configuration for the second communication protocol (e.g., IPv6 address) can be assigned to the first host by an operating system, by a kernel, by the network, etc. In one embodiment, a network configuration for the second communication protocol on a host (e.g., first host, second host, etc.) is static and cannot be configured or changed. For example, in this embodiment, an IPv6 address of a host cannot be configured or changed by a user, by the first host, by the second host, by the management system, etc. In an alternate embodiment, a network configuration for the second communication protocol on a host (e.g., first host, second host, etc.) is configurable, but a default network configuration for the second communication protocol on a host is restored when the host is rebooted. For example, if the first host has a default IPv6 global address of 2001:0db8:0000:0000:0000:ff00:0042:8329 for the first host, and a user has reconfigured the IPv6 global address of the first host to be 2001:0db8:1111:1111:1111:ff11:1142:1234, then the IPv6 global address for the first host will be reset to the default value of 2001:0db8:0000:0000:0000:ff00:0042:8329 when the first host is rebooted or reset. In another example, if the first host has a default IPv6 link local address of FE80:0db8:0000:0000:0000:ff00:0042:8329 for the first host, and a user has reconfigured the IPv6 link local address of the first host to be FE80:0db8:1111:1111:1111:ff11:1142:1234, then the IPv6 link local address for the first host will be reset to the default value of FE80:0db8:0000:0000:0000:ff00:0042:8329 when the first host is rebooted or reset.

In one embodiment, processing logic selects the second host by providing (e.g., sending) a request to multiple hosts on the network using the first communication protocol and upon receiving a confirmation from one of the multiple hosts, selecting that host as the second host. In an alternate embodiment, processing logic selects the second host by providing (e.g., sending) a request to a host that is located near (e.g., physically, logically, etc.) the first host, and selecting the host that is located near the first host as the second host upon receiving a confirmation from the host located near the first host. In this embodiment, if processing logic does not receive a confirmation back from the host located near the first host or receives an error that the host is unreachable, processing logic can select a next host located near the first host and provide (e.g., send) a request to the next host. Processing logic can continue to provide a request to a next host in the network until processing logic receives a confirmation back from a host and select the host from which the confirmation was received as the second host. In another alternate embodiment, processing logic selects the second host by selecting a host (e.g., randomly, based on workload or processing load, etc.)

from the network, providing a request to the selected host, and upon receiving a confirmation from the selected host, select the selected host as the second host. In yet another alternate embodiment, processing logic can use a neighbor service (e.g., neighbor solicitation (NS) service, neighbor advertisement (NA) service, address resolution protocol (ARP) service, etc.) to select the second host. Other methods of selecting the second host can be used without departing from the scope of the present disclosure.

At block 315, processing logic provides a communication to the second host to cause the second host to modify a network configuration associated with the first communication protocol on the first host using the second communication protocol. Processing logic can create the communication to provide to the second host by providing a scope associated with the first host to the second host and providing an update command to the second host. The scope, also known as the IPv6 link address, associated with the first host can define the uniqueness of the IPv6 address. In one embodiment, the scope and the IPv6 address are unique because of a protocol, such as the Duplicate Address Detection (DAD) protocol.

In one embodiment, the scope is based on the network configuration for the second communication protocol on the first host. For example, the scope is based on the IPv6 address assigned to the first host. In an alternate embodiment, the scope associated with the first host is based on the network configuration for the second communication protocol on the first host and other network information. For example, the scope is based on the IPv6 address assigned to the first host and the media access control (MAC) address assigned to the first host. In one embodiment, the upper bits (e.g., 64 bits) representing the network portion of the scope are explicitly set to a valid value (e.g., FE80:: for a IPv6 link local address or 2001:: for a IPv6 global address) based on the IPv6 address, a predefined number of bits (e.g., 48 bits) are set based on an encoding of the MAC address, and the remaining bits (e.g., 8 bits) are predefined (e.g., FFFE). For example, the first host has a local IPv6 address with a MAC address of 78:E7:D1:E4:9D:68. In this example, the upper 64 bits of the scope (IPv6 link address) are set as FE80:: based on the fact that the IPv6 address is local and the MAC address is encoded using the EUI-64 encoding, which flips the seventh most significant bit, resulting in 7A:E7:D1:E4:9D:68. In this example, a predefined value of FFFE is added between bits 23 and 24 of the MAC address, to result in a scope (or IPv6 link address) of FE80::7AE7:D1FF:FEE4:9D68.

As described above, in one embodiment, the network configuration on a host for the second communication protocol is static and cannot be reconfigured. In this embodiment, the scope is therefore also static and cannot be reconfigured because both network configuration on the first host for the second communication protocol and the other network information cannot be reconfigured. Also as described above, in an alternate embodiment, the network configuration on a host for the second communication protocol is not static and is therefore reconfigurable. In this embodiment, prior to providing the scope for the first host to the second host, processing logic provides a command or other indication to the second host to instruct the second host to reboot the first host. By rebooting the first host, the scope of the first host will be reset to a default scope for the first host. The default scope of the first host is known to the processing logic, and therefore once the first host has been rebooted, processing logic can communicate the scope to the second host and cause the second host to securely access the first host and update the network configuration for the first communication protocol on the first host. In one embodiment, processing logic updates the network configuration for the first communication protocol on the first host based on the scope of the first host as described above. In an alternate embodiment, processing logic updates the network configuration for the first communication protocol on the first host by determining the network configuration using a neighbor service (e.g., neighbor solicitation (NS) service, neighbor advertisement (NA) service, address resolution protocol (ARP) service, etc.). In this embodiment, processing logic can determine the network configuration for the first communication protocol on the first host by providing an address (e.g., a link layer address, a hardware address, a MAC address, etc.) to an administrative host and receiving the updated network configuration from the administrative host.

The update command provided by processing logic to the second host can instruct the second host to securely access the first host based on the scope associated with the first host and to modify the network configuration for the first communication protocol on the first host. For example, upon receiving the update command, the second host securely accesses the first host using secure shell (SSH) and injects a file with a correct IPv4 address into the first host using the IPv6 scope for the first host. In another example, the second host securely accesses the first host using telnet and injects a file with a correct IPv4 address for the first host into the first host using the IPv6 address for the first host (when the scope is the IPv6 address). In yet another example, the second host securely accesses the first host using SSH and overwrites a memory location in a memory of the first host using the scope of the first host. In this example, the memory location overwritten in the first host by the second host stores the IPv4 address for the first host. Other implementations of securely accessing the first host by the second host and updating the network configuration for the first communication protocol on the first host based on the scope of the first host (which in turn is based on the second communication protocol) can be used without departing from the scope of the present disclosure. For example, any program capable of using the IPv6 transport can be used to securely access the first host by the second host.

Figure 4:
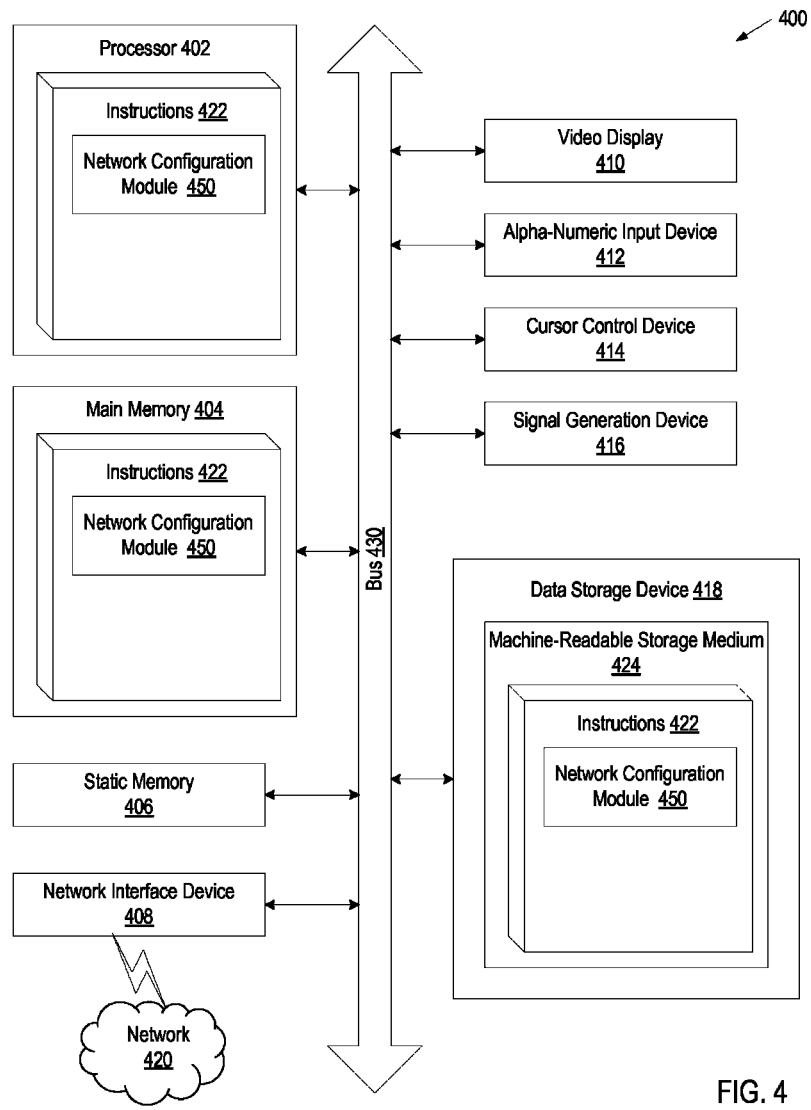
FIG. 4 is a block diagram of an exemplary computer system that may perform one or more of the operations described herein.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, system on chip (SoC) or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 424 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for an network configuration module 450, which may correspond to an network configuration manager module 125 of FIG. 1, and/or a software library containing methods that configure network settings of an unreachable host. While the machine-readable storage medium 424 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating," "creating," "determining," "computing," "identifying," "modifying," "triggering," "injecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

determining, by a processing device, that a first host on a network is unreachable using a first communication protocol;

selecting a second host on the network that is reachable using the first communication protocol in view of a proximity between the first host and the second host, wherein the second host on the network can reach the first host using a second communication protocol; and providing, by the processing device, a communication to the second host on the network using the first communication protocol, wherein the communication causes the second host to access the first host on the network in view of a scope associated with the first host to cause the second host to configure a network configuration of the first host.

2. The method of claim 1, wherein selecting a second host on the network that is reachable comprises:
selecting the second host from one or more hosts on a same segment of the network as the first host in view of the proximity, wherein the processing device can communicate with the second host using the first communication protocol.

3. The method of claim 1, wherein providing the communication to the second host on the network using the first communication protocol comprises:
providing a command to the second host, wherein the command instructs the second host to securely access the first host using the second communication protocol, wherein the network configuration is associated with the first communication protocol.

4. The method of claim 3, wherein the command further instructs the second host to reboot the first host to cause the scope associated with the first host to be configured.

5. The method of claim 3, further comprising:
providing the scope associated with the first host to the second host, wherein the scope for the first host is in view of another network configuration of the first host and a media access control (MAC) address associated with the first host, wherein the another network configuration of the first host is associated with the second communication protocol.

6. The method of claim 1, wherein the first communication protocol is associated with a protocol module in a protocol stack and the second communication protocol is associated with the protocol module in the protocol stack.

7. The method of claim 1, wherein the first communication protocol is Internet Protocol version 4 (IPv4) and the second communication protocol is Internet Protocol version 6 (IPv6).

8. A non-transitory computer readable storage medium having instructions that, when executed by a processing device, cause the processing device to:
determine, by the processing device, that a first host on a network is unreachable using a first communication protocol;
select a second host on the network that is reachable using the first communication protocol in view of a proximity between the first host and the second host, wherein the second host on the network can reach the first host using a second communication protocol; and
provide, by the processing device, a communication to the second host on the network using the first communication protocol, wherein the communication causes the second host to access the first host on the network using the second communication protocol in view of a scope associated with the first host to cause the second host to configure a network configuration of the first host.

9. The non-transitory computer readable storage medium of claim 8, wherein to select a second host on the network that is reachable, the processing device is to:
select the second host from one or more hosts on a same segment of the network as the first host in view of the proximity, wherein the processing device to communicate with the second host using the first communication protocol.

10. The non-transitory computer readable storage medium of claim 8, wherein to provide the communication to the second host on the network using the first communication protocol comprises:
provide a command to the second host, wherein the command instructs the second host to securely access the first host using the second communication protocol, wherein the network configuration is associated with the first communication protocol.

11. The non-transitory computer readable storage medium of claim 10, wherein the command further to instruct the second host to reboot the first host to cause the scope associated with the first host to be configured.

12. The non-transitory computer readable storage medium of claim 10, wherein the processing device is further to:
provide the scope associated with the first host to the second host, wherein the scope for the first host is in view of another network configuration of the first host and a media access control (MAC) address associated with the first host, wherein the another network configuration of the first host is associated with the second communication protocol.

13. The non-transitory computer readable storage medium of claim 8, wherein the first communication protocol is associated with a protocol module in a protocol stack and the second communication protocol is associated with the protocol module in the protocol stack.

14. The non-transitory computer readable storage medium of claim 8, wherein the first communication protocol is Internet Protocol version 4 (IPv4) and the second communication protocol is Internet Protocol version 6 (IPv6).

15. A computing device comprising:
a memory; and
a processing device operatively coupled to the memory, wherein the processing device is to:
determine that a first host on a network is unreachable using a first communication protocol;
select a second host on the network that is reachable using the first communication protocol in view of a proximity between the first host and the second host, wherein the second host on the network can reach the first host using a second communication protocol; and
provide a communication to the second host on the network using the first communication protocol, wherein the communication causes the second host to access the first host on the network in view of a scope associated with the first host to cause the second host to configure a network configuration of the first host.

16. The computing device of claim 15, wherein to select a second host on the network that is reachable, the processing device is further to:
select the second host from one or more hosts on a same segment of the network as the first host in view of the proximity, wherein the processing device can communicate with the second host using the first communication protocol.

17. The computing device of claim 15, the processing device is further to:
provide a command to the second host, wherein the command to instruct the second host to securely access the first host using the second communication protocol, wherein the network configuration is associated with the first communication protocol.

18. The computing device of claim 17, wherein the command further to instruct the second host to reboot the first host to cause the scope associated with the first host to be configured.

19. The computing device of claim 17, wherein the processing device is further to:
provide the scope associated with the first host to the second host, wherein the scope for the first host is in view of another network configuration of the first host and a media access control (MAC) address associated with the first host, wherein the another network configuration of the first host is associated with the second communication protocol.

20. The computing device of claim 15, wherein the first communication protocol is associated with a protocol module in a protocol stack and the second communication protocol is associated with the protocol module in the protocol stack.

* * * * *